United States Patent
Graf et al.

(10) Patent No.: US 6,902,115 B2
(45) Date of Patent: Jun. 7, 2005

(54) DISPLAY DEVICE FOR A PORTABLE DATA CARRIER

(75) Inventors: Hans Graf, Rosenheim (DE); Arno Hohmann, München (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 10/312,570

(22) PCT Filed: Jul. 16, 2001

(86) PCT No.: PCT/EP01/08196

§ 371 (c)(1),
(2), (4) Date: Oct. 15, 2003

(87) PCT Pub. No.: WO02/07079

PCT Pub. Date: Jan. 24, 2002

(65) Prior Publication Data

US 2004/0056083 A1 Mar. 25, 2004

(30) Foreign Application Priority Data

Jul. 17, 2000 (DE) .......................... 100 35 094

(51) Int. Cl.⁷ ............................ G06K 5/00; G06F 17/60
(52) U.S. Cl. .................. 235/472.01; 235/379; 235/380; 235/382; 235/383; 235/587; 235/492; 902/25; 902/26
(58) Field of Search ................................ 235/379, 380, 235/492, 487, 493, 472.01, 382, 383; 902/25, 26

(56) References Cited

U.S. PATENT DOCUMENTS 4,827,111 A * 5/1989 Kondo ........................ 235/380
4,924,075 A    5/1990 Tsutomu
5,438,679 A    8/1995 Shinichi et al.
5,473,145 A   12/1995 Christian et al.
6,297,789 B2 * 10/2001 Gauthier et al. .............. 345/87

FOREIGN PATENT DOCUMENTS

| DE | 38 04 618 A1 | 8/1989 |
| DE | 41 38 131 A | 4/1993 |
| DE | 42 03 748 A | 8/1993 |
| DE | 196 31 557 A | 2/1998 |
| DE | 196 33 945 A1 | 2/1998 |
| DE | 298 03 987 U1 | 6/1998 |
| DE | 198 29 727 A1 | 1/2000 |

* cited by examiner

Primary Examiner—Karl D. Frech
Assistant Examiner—Daniel Walsh
(74) Attorney, Agent, or Firm—Bacon & Thomas PLLC

(57) ABSTRACT

The invention relates to a portable data carrier having a display device. This data carrier contains a microprocessor and storage devices associated with the microprocessor as well as means for displaying data stored in the storage devices associated with the microprocessor. In addition, the data carrier contains a display controller for controlling the display means and an energy supply unit for supplying at least the display unit and its controller with energy.

Such a data carrier is to be improved so as to reduce the energy demand for the display unit. This is obtained by a nonvolatile memory disposed separately from the microprocessor and its storage device, said memory being associated with the controller of the display means and containing the data intended for display.

4 Claims, 1 Drawing Sheet

DISPLAY DEVICE FOR A PORTABLE DATA CARRIER

BACKGROUND

German laid-open print DE-A 42 03 748 discloses a method for utilizing and evaluating rechargeable smart cards wherein payments by means of a smart card are recorded in a nonvolatile memory of the card. At each charging, the preceding payment transactions are erased and the available credit balance stored. It is in particular provided that the most recently inputted or most recently debited value is indicated on a display located on the card. Such a method or device is intended to increase the acceptance of purse smart cards since the user has at least a certain possibility of checking his current credit balance or the most recent transaction.

Further, from German laid-open print DE-A 196 31 557 discloses a display unit for a smart card. Here, too, the display of the current credit balance is intended to increase the acceptance of purse smart cards. The presented smart card has a smart card processor with terminals as well as a magnetic stripe and a field for an embossing as is usual in cards. Further, a display controller is implemented as a separate unit for controlling the display. For the power supply required for the display, a solar cell is provided.

A smart card having a display and a solar cell or a battery is known from European laid-open print EP-A 0 299 414 as well as from U.S. Pat. Nos. 4,827,111, 4,924,075, and 5,438,679.

The disadvantage of known smart cards is that the power supply causes a problem on a smart card because of the low capacity of the available energy sources. In particular, it has proved problematic that due to the comparatively high clock frequency of the card microprocessor, which must be at least one megahertz for safety reasons, high current consumption considerably restricts the service life of the energy source or makes it very difficult or impossible to use a solar cell, for example, in smart cards.

SUMMARY

It is therefore the problem of the invention to state a portable data carrier having a display device that has a low energy demand in particular for the display control or data storage.

Advantageous embodiments of the invention are stated in the dependent claims.

According to the invention it is provided that an additional memory is used that can be operated independently of the card microprocessor. This memory stores those data that are released for display. This additional memory is associated with the display controller and thus independent of the card microprocessor. In particular it is advantageous that the microprocessor does not have to be in operation for data to be displayed, i.e. the energy demand can be reduced since few functional units, for example clock generator, display control and storage device, have to be supplied with energy.

It has proved especially advantageous to provide the display controller and thus indirectly also the additional memory with a separate clock generator, the system clock generated by this clock generator having a lower clock frequency than the system clock of the microprocessor. This obtains a further reduction of the energy demand for displaying data.

It has further proved advantageous to connect a buffer upstream of the nonvolatile memory. Since there is the possibility during transfer of the display data from the microprocessor to the additional memory of a user removing the card from the terminal while the data are being transferred to the additional memory, the buffer constitutes a safety stage preventing inconsistent data from being stored in the additional memory. The data are transferred from the buffer to the additional memory only when they have been completely transferred from the microprocessor memory. Data transfer from the microprocessor to the buffer is effected via the serial interface according to the transfer protocol provided for the smart card. Transfer from the buffer to the additional memory can be effected via a parallel interface, which keeps the time for transferring data from the buffer to the additional memory very low.

Further, transfer can also be effected without energy supply by the terminal since the energy source located on the card can be used for this purpose.

According to a further advantageous embodiment of the invention, the portable data carrier is an electronic purse, i.e. a purse smart card, wherein the additional memory stores not only the current amount present in the purse but also previous transaction data, so that the latter can be called up by the user if required.

The display controller is preferably actuated by a switch, so that for example at one press on the switch the display unit is activated, and at each further press on the switch the previous transaction data are indicated on the display unit. The display unit is preferably switched off after relatively long nonuse of the switch.

The invention further provides a method for operating an electronic purse. According to the inventive method, the transaction data are copied from the memory of the purse chip to the separate memory after termination of a transaction, which takes place according to the provided protocols like a known transaction. After termination of the copying operation to the separate memory, the display controller preferably feeds an acknowledge signal to the purse chip to indicate that the data have been completely transferred. After receiving this first acknowledge signal, the purse chip sends a second acknowledge signal to the terminal. The terminal in turn shows on an optical or acoustic display unit as a result of this second acknowledge signal a message asking the user to remove the card, after which communication with the terminal is ended.

BRIEF DESCRIPTION OF THE DRAWINGS

Hereinafter the invention will be explained in more detail with reference to FIG. 1 showing the basic structure of an inventive data carrier.

DESCRIPTION OF VARIOUS EMBODIMENTS

Figure 1:
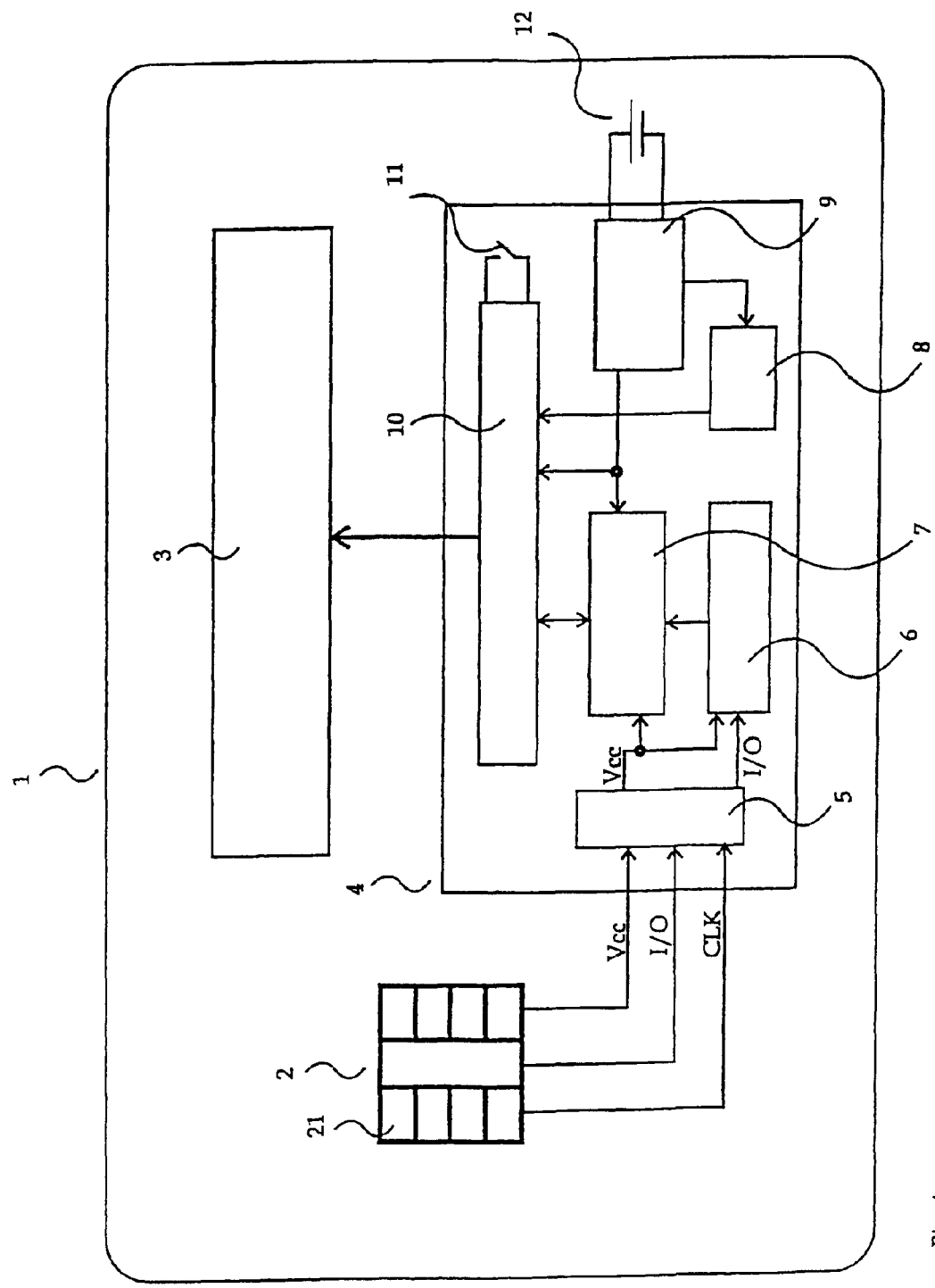
FIG. 1 shows a smart card, preferably a purse smart card, containing purse chip 2 disposed in a module with contact surfaces 21.

Further, purse smart card 1 contains display unit 3 controlled by functional unit 4 disposed separately from the purse chip 2. Functional unit 4 contains purse chip interface 5 to which data input/output line I/O as well as clock supply CLK and power supply line Vcc lead from the purse chip. From purse chip interface 5 connecting lines lead to buffer 6 and from there to nonvolatile separate memory 7. If buffer 6 is not provided, the connecting lines lead directly to additional memory 7. Buffer 6 is preferably executed as a RAM, while separate memory 7 is executed as a nonvolatile, preferably $E^2PROM$, memory.

Nonvolatile memory 7 is connected with display controller 10 which in turn controls display unit 3. The display unit can only display the data stored in nonvolatile memory 7 and thus released for display.

Power or clock supply is effected via analog interface 9 connected with energy supply unit 12 disposed on the card. Energy supply unit 12 can also be applied to the analog interface via a switch. Energy supplied via the analog interface is made available to nonvolatile memory 7 as well as display controller 10 and clock generator 8. Clock generator 8 serves display controller 10 as its clock supply. It is essential to the invention that controller 4 for controlling display unit 3 can also be operated without energy supply or without operation of the purse chip, i.e. without the card being introduced into a terminal, so that data can be indicated on the display unit. The independence of controller 4 lowers energy consumption and readily permits energy sources 12 to be used that supply display unit 3 and its controller 4 with energy for the life of card 1. Examples of energy sources to be mentioned are thin-film batteries, flat accumulators, piezoelectric elements or solar cells.

Clock generator 8 used for the clock supply of controller 10 of separate memory 7 and optionally buffer 6 generates a clock frequency that is preferably distinctly below the clock frequency of the purse chip. This permits a further reduction of energy consumption for the display unit and its controller.

The purse chip interface has inputs Vcc for power supply, CLK for the external clock and I/O for the data. For data exchange the I/O interface is executed to be bidirectional or unidirectional, whereby a plurality of I/O lines can also be provided in parallel.

In the unidirectional execution, data of the purse chip can be written to memory 6 or 7 but rewriting of data to the purse chip is not possible. This prevents manipulation of the data stored in the purse chip.

Bidirectional execution has the advantage, however, of permitting feedback with respect to the data copying operation from controller 4 to purse chip 2.

No additional security apparatus for data transfer is necessary since the data indicated on the display unit, i.e. the data transferred to controller 4 from the purse chip, are not in need of being kept secret.

Via the I/O line the data intended for display are fed via purse chip interface 5 to buffer 6 or additional memory 7 after a transaction of the purse chip with the terminal is completed to the extent that the transaction data are updated on the purse chip. Only after complete transfer of the data to additional memory 7 or at least to buffer 6 is the terminal informed by an acknowledge signal that the transaction is completed.

What is claimed is:

1. A portable data carrier having a display device comprising:

a microprocessor and storage devices associated with the microprocessor;

means for contactless and/or contact-type coupling with external devices;

means for displaying or selecting data stored in storage devices associated with the microprocessor;

a display controller for controlling the display device;

an energy supply unit for supplying the display device and the display controller with energy;

a nonvolatile memory disposed separately from the microprocessor and its associated storage device, said memory being associated with the display controller and containing the data intended for display in order to display data in connection with the energy supply unit without operation of the microprocessor;

wherein the display controller is supplied by a separate clock generator with a system clock having a lower frequency than the system clock of the microprocessor.

2. The portable data carrier according to claim 1, wherein the nonvolatile memory associated with the display controller has a buffer located away therefrom.

3. The portable data carrier according to claim 1, wherein the microprocessor and its associated storage device are provided to form an electronic purse and the separate memory associated with the display controller stores the current amount present in the purse and previous transaction data.

4. The portable data carrier according to claim 1, wherein the display controller is actuated by a switch.

* * * * *